US012656653B2

(12) United States Patent
Eiselt et al.

(10) Patent No.: US 12,656,653 B2
(45) Date of Patent: Jun. 16, 2026

(54) METHOD FOR DETERMINING A REQUIRED ADAPTION OF A BIAS OF AN ELECTRO-OPTIC MODULATOR

(71) Applicant: Adtran Networks SE, Meiningen (DE)

(72) Inventors: Michael Eiselt, Kirchheim (DE); Pablo Castro Ayala, Meiningen (DE)

(73) Assignee: Adtran Networks SE, Meiningen (DE)

( * ) Notice: Subject to any disclaimer, the term of this patent is extended or adjusted under 35 U.S.C. 154(b) by 312 days.

(21) Appl. No.: 18/230,755

(22) Filed: Aug. 7, 2023

(65) Prior Publication Data

US 2024/0045301 A1     Feb. 8, 2024

(30) Foreign Application Priority Data

Aug. 8, 2022    (EP) ..................................... 22189316

(51) Int. Cl.
  *G02F 1/21*          (2006.01)
(52) U.S. Cl.
  CPC ..................................... *G02F 1/212* (2021.01)
(58) Field of Classification Search
  CPC ....................................................... G02F 1/212
  USPC ......................................................... 359/279
  See application file for complete search history.

(56) References Cited

U.S. PATENT DOCUMENTS

| | | | |
|---|---|---|---|
| 8,184,991 | B2 | 5/2012 | Farina et al. |
| 10,180,617 | B1 | 1/2019 | Takei |
| 2011/0019199 | A1 | 1/2011 | Kawanishi et al. |
| 2012/0162656 | A1 | 6/2012 | Kawanishi et al. |
| 2015/0110436 | A1 | 4/2015 | Smith et al. |
| 2015/0110500 | A1 | 4/2015 | Noguchi |
| 2019/0190610 | A1 | 6/2019 | Li et al. |
| 2020/0393705 | A1 | 12/2020 | Stark et al. |
| 2021/0223658 | A1 | 7/2021 | Huang et al. |
| 2022/0043320 | A1 | 2/2022 | Kawakami et al. |

*Primary Examiner* — William Choi
(74) *Attorney, Agent, or Firm* — The Webb Law Firm

(57) ABSTRACT

Provided is a method for determining a required adaption of a bias of an electro-optic modulator. The electro-optic modulator includes an input waveguide that is split into two paths. The two paths are then recombined into an output waveguide. The method includes the steps of recording a modulation voltage applied to the electro-optic modulator over a particular amount of time; recording a power at an output of the electro-optic modulator in response to the modulation voltage over the particular amount of time; correlating the recorded modulation voltage and the recorded power; and determining the required adaption of the bias based on the correlation between the recorded modulation voltage and the recorded power.

10 Claims, 3 Drawing Sheets

METHOD FOR DETERMINING A REQUIRED ADAPTION OF A BIAS OF AN ELECTRO-OPTIC MODULATOR

CROSS REFERENCE TO RELATED APPLICATION

This application claims priority to European Patent Application No. 22189316.7, filed Aug. 8, 2022, the disclosure of which is hereby incorporated by reference in its entirety.

BACKGROUND OF THE INVENTION

Field of the Invention

The present invention relates to a method for determining a required adaption of a bias of an electro-optic modulator, with which costs can be saved and which also works for very low modulation frequencies.

Description of Related Art

An electro-optic modulator is an optical device in which a signal-controlled element exhibiting an electro-optic effect is used to modulate a beam of light. The modulation may be imposed on the phase, frequency, amplitude, or polarization of the light beam.

Such an electro-optic modulator can comprise an input waveguide that is split into two paths, wherein the two paths are then recombined into an output waveguide. An example of such an electro-optic modulator is a Mach-Zehnder modulator or a combination of multiple correspondingly arranged modulators. Therein, the two paths make up two arms of the electro-optic modulator, wherein the optical index modulation induced on each of the two arms creates an intensity modulation at the output of the modulator.

These modulators are usually designed in such a way that there is no phase shift between the two arms of the modulator. However, as there is always a small phase shift between these two arms, which can for example be introduced by material inhomogeneity or manufacturing tolerances and which might change over time with temperature or aging, not only a modulation voltage is applied to the modulator when modulating a light beam, but also a bias or a bias voltage, respectively, to set the phase shift to the desired operating point and to compensate for changes of this phase shift.

However, as this phase shift may vary during operation, for example due to thermal changes or aging, it is necessary to control the drift of the phase shift between the two arms of the modulator, and therefore, the required bias over time.

There are methods known for controlling the bias of such an electro-optic modulator, wherein sinusoidal dither signals are applied to the modulator, wherein the power variation at the output of the modulator is observed, and wherein the frequency components of the output power are evaluated at the dither frequency and twice the dither frequency. However, these methods require the use of multiple electronic components and are, therefore, costly. Further, these methods are usually only able to control the bias for high-speed modulation signals, where the data average is zero. Also, the quality of the outputted modulated signal may be decreased by the additional dither signal. Therefore, there is need for an improved method for controlling the bias of such an electro-optic modulator.

Such an electro-optic modulator or a corresponding IQ modulator, respectively, can for example be used in phase tracking of a laser, based on feedback of a phase comparator between the delayed laser phase and the current laser phase. In particular, the corresponding electro-optic modulator or the corresponding IQ modulator, respectively, can be used in phase tracking of a laser to reduce phase noise.

U.S. Pat. No. 8,184,991 B2 discloses a method for controlling the operating parameters of an optical modulator without using a dither signal. Past operating parameters are compared to present operating parameters using a quality of the modulation signal obtained by cross-correlating the data modulation signal used to drive the optical modulator with the modulated optical signal output from the optical modulator. The quality of the modulation signal is used to optimize the operating parameters of the optical modulator or other operating parameters of the arrangement, such as the modulator drive level, timing alignment, etc.

SUMMARY OF THE INVENTION

It is an object of the present invention to provide an improved method for determining a required adaption of a bias of an electro-optic modulator, wherein the electro-optic modulator comprises an input waveguide that is split into two paths, wherein the two paths are then recombined into an output waveguide.

This object is solved by a method for determining a required adaption of a bias of an electro-optic modulator as described herein.

This object is further solved by a system for determining a required adaption of a bias of an electro-optic modulator as described herein.

According to one embodiment of the invention, this object is solved by a method for determining a required adaption of a bias of an electro-optic modulator, wherein the electro-optic modulator comprises an input waveguide that is split into two paths, wherein the two paths are then recombined into an output waveguide, and wherein the method comprises recording a modulation voltage applied to the electro-optic modulator over a particular amount of time, recording a power at an output of the electro-optic modulator in response to the modulation voltage over the particular amount of time, correlating the recorded modulation voltage and the recorded power, and determining a required adaption of the bias based on the correlation between the recorded modulation voltage and the recorded power.

Here, that the modulation voltage is recorded over the particular, either given or predefined amount of time means that the modulation voltage is gathered over the particular amount of time, wherein the correspondingly gathered values of the modulation voltage can possibly be recorded or represented, respectively, in a diagram showing the values of the modulation voltage over the particular amount of time.

Similarly, that the power at the output of the electro-optic modulator in response to the modulation voltage is recorded over the particular amount of time means that the power is gathered over the particular amount of time, wherein the correspondingly gathered values of the power can again possibly be recorded or represented, respectively, in a diagram showing the values of the power over the particular amount of time.

Further, that the recorded modulation voltage and the recorded power are correlated means that a relation between the recorded modulation voltage and the recorded power is determined, wherein this relation can for example be determined based on a diagram, in which the gathered values of the modulation voltage are respectively shown in conjunction with a gathered value of the power that has been gathered at the same time as the corresponding value of the modulation voltage, wherein the recorded power can for example be displayed as a function of the modulation phase, and wherein the modulation phase of the optical signal is changed by the modulation voltage.

The method is based on the fact that if the modulation voltage is varied this leads to a particular variation of the outputted power, if the bias is set correctly. This particular relation is tested by the correlation between modulation voltage and output power.

Thus, a method for determining a required adaption of the bias is provided that does not require dithering of the bias, whereby costs can be saved, and whereby distortions on to the signal by the dither can be eliminated.

Therefore, an improved method for determining a required adaption of a bias of an electro-optic modulator, wherein the electro-optic modulator comprises an input waveguide that is split into two paths, wherein the two paths are then recombined into an output waveguide, is provided.

In one embodiment, the method further comprises a step of low-pass filtering the modulation voltage applied to the electro-optic modulator, wherein the step of recording the modulation voltage applied to the electro-optic modulator over a particular amount of time comprises recording the filtered modulation voltage over the particular amount of time.

Here, that the modulation voltage is low-pass filtered means that some parts of the modulation voltage that have a lower frequency than a selected or, respectively, predefined value are passed, whereas values that have a higher frequency than this predefined value are disregarded or attenuated.

Even if the modulation signal is a high frequency signal, it still contains low frequency components. Thus, the method also works for high-frequency modulation signals and for very low modulation frequencies, wherein the average value, even over a larger time, might not be zero and would therefore contribute to the bias.

The method can further comprise a step of re-ordering the modulation voltages and the recorded power, wherein the required adaption of the bias is determined based on correlation between correspondingly re-ordered value pairs.

Here, that the recorded modulation voltage and the recorded power are respectively re-ordered means that the values defining the corresponding relation, or the values shown in the corresponding diagram, respectively, are re-ordered. For example, the values of the recorded modulation voltage can be sorted by increasing phase values, such that the corresponding power values are also correspondingly re-ordered. In particular, the values can for example be re-ordered to mimic a certain modulation signal.

Thereby, the determining of the required adaption of the bias can be further simplified.

The method can also comprise dividing the modulation voltage applied to the electro-optic modulator into a plurality of ranges, wherein the plurality of ranges are respectively defined by their central value and for each of the plurality of ranges, which are respectively defined by their central value, averaging the values of the power at the output of the electro-optic modulator recorded while the modulation voltage falls into the corresponding range to produce an averaged power value for the corresponding modulation voltage range, and wherein the step of correlating the recorded modulation voltage and the recorded power comprises, for each of the plurality of ranges, respectively correlating the corresponding central value of the modulation voltage and the averaged power value for the corresponding range.

Here, that the modulation voltage is divided into a plurality of ranges means that the gathered values of the modulation voltage are divided into groups or ranges, respectively, for example based on the corresponding modulation signal, for example ranges of a few millivolts or fractions of the modulator's V-pi, wherein the plurality of ranges are respectively defined by their central value.

Thereby, any medium-term or slow offset, respectively, which would otherwise be interpreted as bias and compensated, can be correctly identified.

According to another embodiment of the invention, a method for controlling a bias of an electro-optic modulator is provided, wherein the electro-optic modulator comprises an input waveguide that is split into two paths, wherein the two paths are then recombined into an output waveguide, and wherein the method comprises determining a required adaption of the bias of the electro-optic modulator by a method for determining a required adaption of a bias of an electro-optic modulator as described above, and controlling the bias of the electro-optic modulator based on the determined required adaption of the bias.

Thus, a method for controlling a bias of an electro-optic modulator, wherein the electro-optic modulator comprises an input waveguide that is split into two paths, and wherein the two paths are then recombined into an output voltage, is provided, that is based on an improved method for determining a required adaption of the bias of an electro-optic modulator. The determination of the required adaption of the bias is based on the fact that, if the modulation voltage is varied, this leads to a particular variation of the outputted power, if the bias is set correctly. This particular relation is tested based on the correlation between the modulation voltage and the output power.

Therefore, the determination of the required adaption of the bias does not require dithering of the bias, whereby costs can be saved, and whereby distortions on to the signal by the dither can be eliminated.

According to still a further embodiment of the invention, a system for determining a required adaption of a bias of an electro-optic modulator is provided, wherein the electro-optic modulator comprises an input waveguide that is split into two paths, wherein the two paths are then recombined into an output waveguide, and wherein the system comprises a first recording device that is configured to record a modulation voltage applied to the electro-optic modulator over a particular amount of time, a second recording device that is configured to record a power of a signal outputted by the electro-optic modulator in response to the modulation voltage over the particular amount of time, a correlating device that is configured to correlate the recorded modulation voltage and the recorded power, and a determining device that is configured to determine the required adaption of the bias based on the correlation between the recorded modulation voltage and the recorded power.

Thus, an improved system for determining a required adaption of a bias of an electro-optic modulator, wherein the electro-optic modulator comprises an input waveguide that is split into two paths, wherein the two paths are then recombined into an output waveguide, is provided. Therein, if the modulation voltage is varied, this leads to a particular variation of the outputted power, if the bias is set correctly. This particular relation is tested based on the correlation between the modulation voltage and the output power. Therefore, a system for determining a required adaption of the bias is provided that does not require dithering of the bias, whereby costs can be saved, and whereby distortions on to the signal by the dither can be eliminated.

In one embodiment, the system can further comprise a low-pass filter that is configured to low-pass filter the modulation voltage applied to the electro-optic modulator, and wherein the first recording device is configured to record the filtered modulation voltage over the particular amount of time. Even if the modulation signal is a high frequency signal, it still contains low frequency components. Thus, the system also works for high-frequency modulation signals and for very low modulation frequencies, wherein the average value, even over a larger time, might not be zero and would therefore contribute to the bias.

The system can further comprise a re-order device that is configured to re-order the recorded modulation voltage and the recorded power, wherein the determining device is configured to determine the required adaption of the bias based on correlation of the correspondingly re-ordered value pairs. Thereby, the determining of the required adaption of the bias can be further simplified.

Further, the system can further comprise a dividing device that is configured to divide the modulation voltage applied to the electro-optic modulator into a plurality of ranges, wherein the plurality of ranges are respectively defined by their central value, and an averaging device that is configured to, for each of the plurality of ranges, average the values of the power at the output of the electro-optic modulator recorded while the modulation voltage falls into the corresponding range to produce an averaged power value for the corresponding range, and wherein the correlating device is configured to, for each of the plurality of ranges, respectively correlate the corresponding central value of the modulation voltage and the averaged power value of the corresponding range. Thereby, any medium-term or slow offset, respectively, which would otherwise be interpreted as bias and compensated, can be correctly identified.

According to still another embodiment of the invention, a system for controlling a bias of an electro-optic modulator is provided, wherein the electro-optic modulator comprises an input waveguide that is split into two paths, wherein the two paths are then recombined into an output waveguide, wherein the system comprises a system for determining a required adaption of a bias of an electro-optic modulator as described above and a controlling device that is configured to control the bias of the electro-optic modulator based on a required adaption of the bias of the electro-optic modulator determined by the system for determining a required adaption of a bias of an electro-optic modulator.

Thus, a system for controlling a bias of an electro-optic modulator, wherein the electro-optic modulator comprises an input waveguide that is split into two paths, and wherein the two paths are then recombined into an output waveguide, is provided, that is based on an improved system for determining a required adaption of the bias of an electro-optic modulator. The determination of the required adaption of the bias is based on the fact that if the modulation voltage is varied, this leads to a particular variation of the outputted power, if the bias is set correctly. This particular relation is tested based on the correlation between the modulation voltage and the output power. Therefore, the determination of the required adaption of the bias does not require dithering of the bias, whereby costs can be saved, and whereby distortions on to the signal by the dither can be eliminated.

BRIEF DESCRIPTION OF THE DRAWINGS

The terms Fig., Figs., Figure, and Figures are used interchangeably in the specification to refer to the corresponding figures in the drawings.

The invention will now be described in further detail with reference to the attached drawings.

DESCRIPTION OF THE INVENTION

Figure 1:
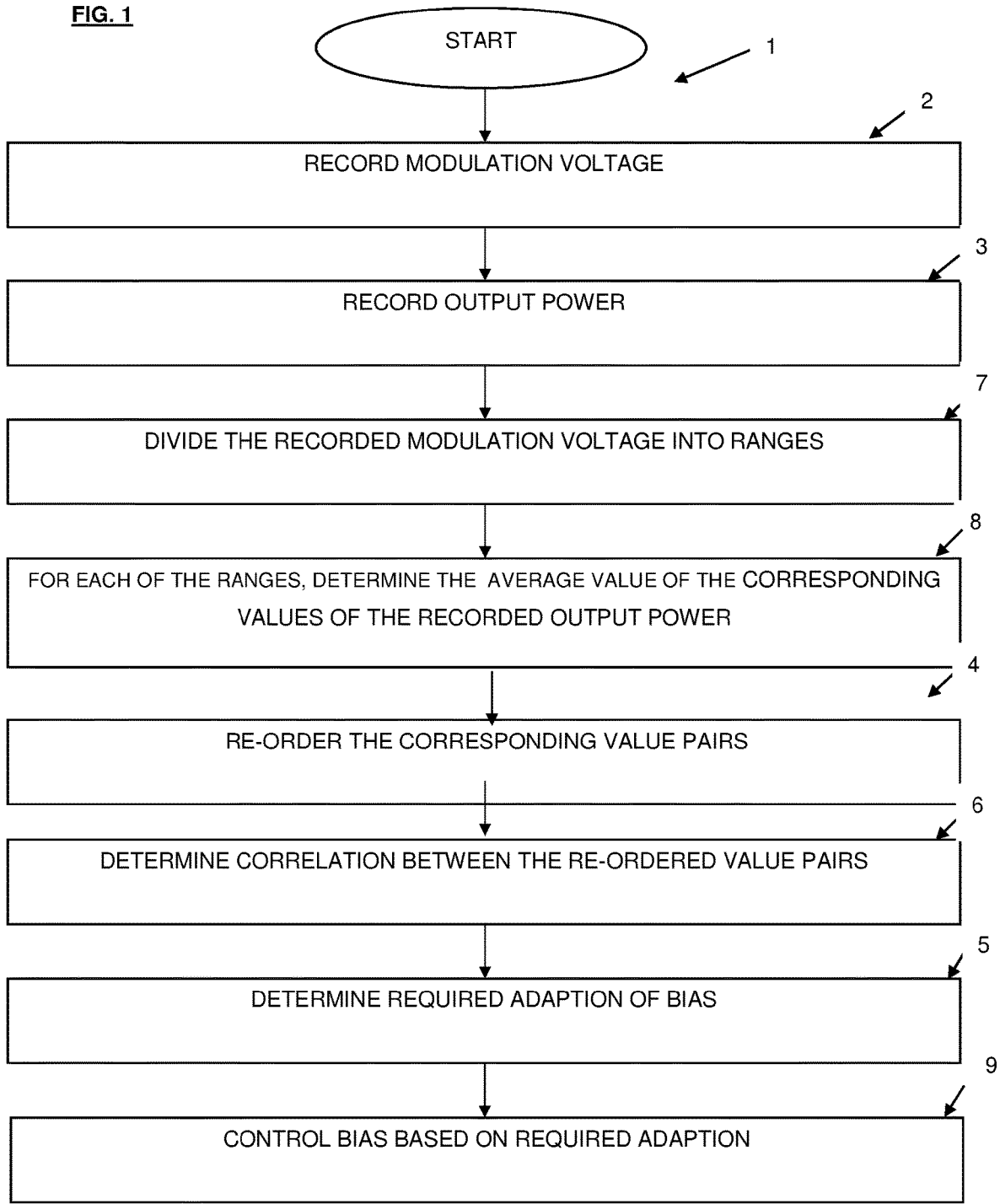
FIG. 1 illustrates a method for controlling a bias of an electro-optic modulator, wherein the electro-optic modulator comprises an input waveguide that is split into two paths, wherein the two paths are then recombined into an output waveguide, according to a first embodiment of the invention.

FIG. 1 illustrates a method for controlling a bias of an electro-optic modulator 1, wherein the electro-optic modulator comprises an input waveguide that is split into two paths, wherein the two paths are then recombined into an output waveguide, according to a first embodiment of the invention.

The bias of a Mach-Zehnder modulator or the independent biases of the arms of a Mach-Zehnder based IQ-modulator and the phase between the arms drift over time and need to be controlled.

There are for example methods known for controlling the bias of such a Mach-Zehnder based wherein sinusoidal dither signals are applied to the I and Q branches of the IQ-modulator, wherein the power variation at the output of the modulator is observed, and wherein the frequency components of the output power are evaluated at the dither frequency and twice the dither frequency. Therein, when the bias is dithered, the output power varies with the same frequency, or twice the frequency, respectively, when the bias in the arms is not correct.

FIG. 1 shows a method 1, which comprises a step 2 of recording a modulation voltage applied to the electro-optic modulator over a particular amount of time, a step 3 of recording a power at an output of the electro-optic modulator in response to the modulation voltage over the particular amount of time, a step 4 of correlating the recorded modulation voltage and the recorded power, and a step 5 of determining a required adaption of the bias based on the correlation between the recorded modulation voltage and the recorded power.

The method 1 is based on the fact that if the modulation voltage is varied, this leads to a particular variation of the outputted power, if the bias is set correctly. This particular relation is tested based on the correlation between the modulation voltage and the output power.

Thus, a method for determining a required adaption of the bias is provided that does not require dithering of the bias, whereby costs can be saved, and whereby distortions on to the signal by the dither can be eliminated.

Therefore, an improved method for determining a required adaption of a bias of an electro-optic modulator, wherein the electro-optic modulator comprises an input waveguide that is split into two paths, wherein the two paths are then recombined into an output waveguide, is provided.

In particular, FIG. 1 shows a method 1, wherein a dither signal is artificially constructed from samples of the modulated signal, wherein for each voltage change to the modulator, or each corresponding new phase setting of the optical signal, respectively, the output power at the modulator output is recorded, wherein the recorded output power can be displayed as a function of the modulation phase, and wherein a bias offset can be derived from this function.

Therein, the bias offset or the required adaption of the bias, respectively, can for example be determined based on a fundamental frequency or a harmonic of this artificially constructed dither signal. For example, the power variation can have a strong component at twice the phase rotation speed, if an IQ-modulator consisting of two parallel Mach-Zehnder modulators in a nested Mach-Zehnder structure is used, or, for other bias and phase errors, components at the fundamental and the harmonic of the phase rotation. Therein, for example the DC component, the imaginary part of the first harmonic, and real and imaginary parts of the fundamental frequency can be calculated and respectively be normalized, wherein the values of the real and imaginary parts of the fundamental frequency and the first harmonic of the correlation between the recorded power values and the phase of the optical signal can be used to measure the phase errors of the 90° phase shifter and of the in-phase and quadrature arms, due to the effect these elements respectively have over the magnitude and phase of the first harmonic and the fundamental frequency.

As shown in FIG. 1, the shown method 1 further comprises a step 6 of re-ordering the recorded modulation voltage and the recorded power, wherein the required adaption of the bias is determined based on a correlation of the correspondingly re-ordered value pairs.

Therein, the values of the recorded modulation voltage can for example be re-ordered to mimic a certain modulation signal, wherein the values of the recorded modulation voltage can for example be sorted by increasing or decreasing phase values, while the corresponding power values are also correspondingly re-ordered.

According to the first embodiment, the method 1 further comprises a step 7 of dividing the modulation voltage applied to the electro-optic modulator into a plurality of ranges, wherein the plurality of ranges are respectively defined by their central value, and a step 8 of, for each of the plurality of ranges, respectively averaging the values of the output power recorded while the modulation voltage falls into the corresponding range to produce an averaged power value for the corresponding range, and wherein the step 4 of correlating the recorded modulation voltage and the recorded power comprises, for each of the plurality of ranges, respectively correlating the corresponding central value of the modulation voltage and the averaged power value for the corresponding range.

Alternatively, the step 4 of correlating the recorded modulation voltage and the recorded power can also comprise, for each of the plurality of ranges, respectively correlating the mean value of the recorded modulation voltages of the corresponding range and the averaged power value for the corresponding range.

FIG. 1 further shows a step 9 of controlling the bias of the electro-optic modulator based on the determined required adaption of the bias.

Thus, a method 1 is provided, wherein a bias drift is controlled based on monitoring the output power of the electro-optic modulator, while the phase setting is varied.

Therein, the corresponding electro-optic modulator, or a corresponding IQ modulator, respectively, can for example be used in phase tracking of a laser, based on a feedback of a phase comparator between the delayed laser phase and the current laser phase. In particular, the corresponding electro-optic modulator, or the corresponding IQ modulator, respectively, can be used in phase tracking of a laser to reduce phase noise. Therein, during regular operation of the IQ modulator, intended I and Q values are recorded together with the resulting output power. The intended I and Q values can be translated into amplitude and phase values, and the recorded output power can be assigned to a range or a group, respectively, in which all output power values for a particular amplitude/phase combination are averaged. Out of these groups, a series of output power values can then be constructed that follows an increasing phase series for a particular amplitude. This re-constructed output power series is equivalent to the case that the bias voltage is actually modulated to yield a circular time signal and can therefore be used for example by correlation with sine and cosine functions at the fundamental and harmonic frequencies to get a feedback signal for the control of the bias voltages and the phase settings between the I and Q branches.

Figure 2:
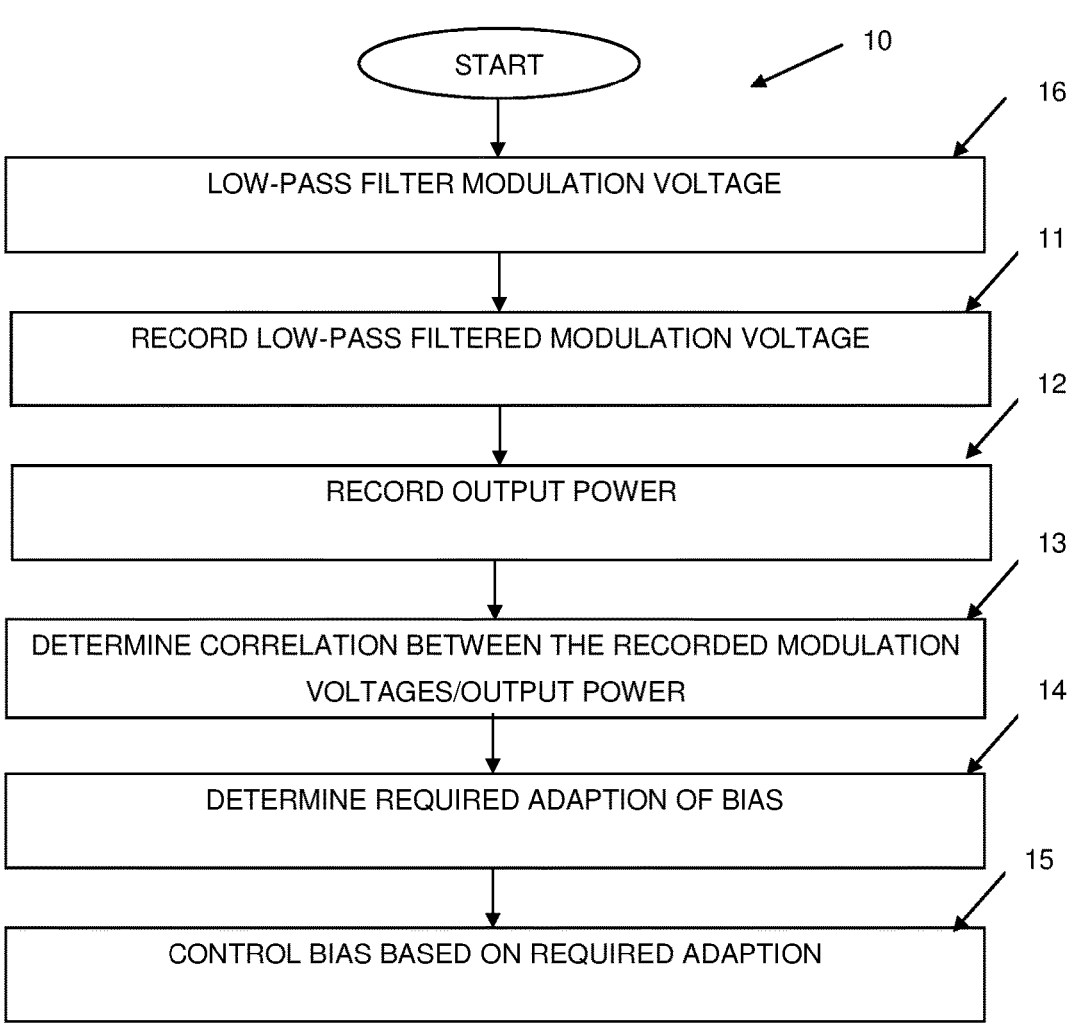
FIG. 2 illustrates a method for controlling a bias of an electro-optic modulator, wherein the electro-optic modulator comprises an input waveguide that is split into two paths, wherein the two paths are then recombined into an output waveguide, according to a second embodiment of the invention.

FIG. 2 illustrates a method for controlling the bias of an electro-optic modulator 10, wherein the electro-optic modulator comprises an input waveguide that is split into two paths, wherein the two paths are then recombined into an output waveguide, according to a second embodiment of the invention.

As shown in FIG. 2, the method again comprises a step 11 of recording a modulation voltage applied to the electro-optic modulator over a particular amount of time, a step 12 of recording a power at an output of the electro-optic modulator in response to the modulation voltage over the particular amount of time, a step 13 of correlating the recorded modulation voltage and the recorded power, and a step 14 of determining a required adaption of the bias based on the correlation between the recorded modulation voltage and the recorded power.

FIG. 2 further shows a step 15 of controlling the bias of the electro-optic modulator based on the determined required adaption of the bias.

Therein, the difference between the method 10 according to the second embodiment shown in FIG. 2 and the method 1 according to the first embodiment shown in FIG. 1 is that the method 10 according to the second embodiment further comprises a step 16 of low-pass filtering the modulation voltage applied to the electro-optic modulator, wherein the step 11 of recording the modulation voltage applied to the electro-optic modulator over a particular amount of time comprises recording the filtered modulation voltage over the particular amount of time.

Thus, the method 10 according to the second embodiment also works for high-frequency modulation signals which still contain low frequency components that are used for the bias control.

Figure 3:
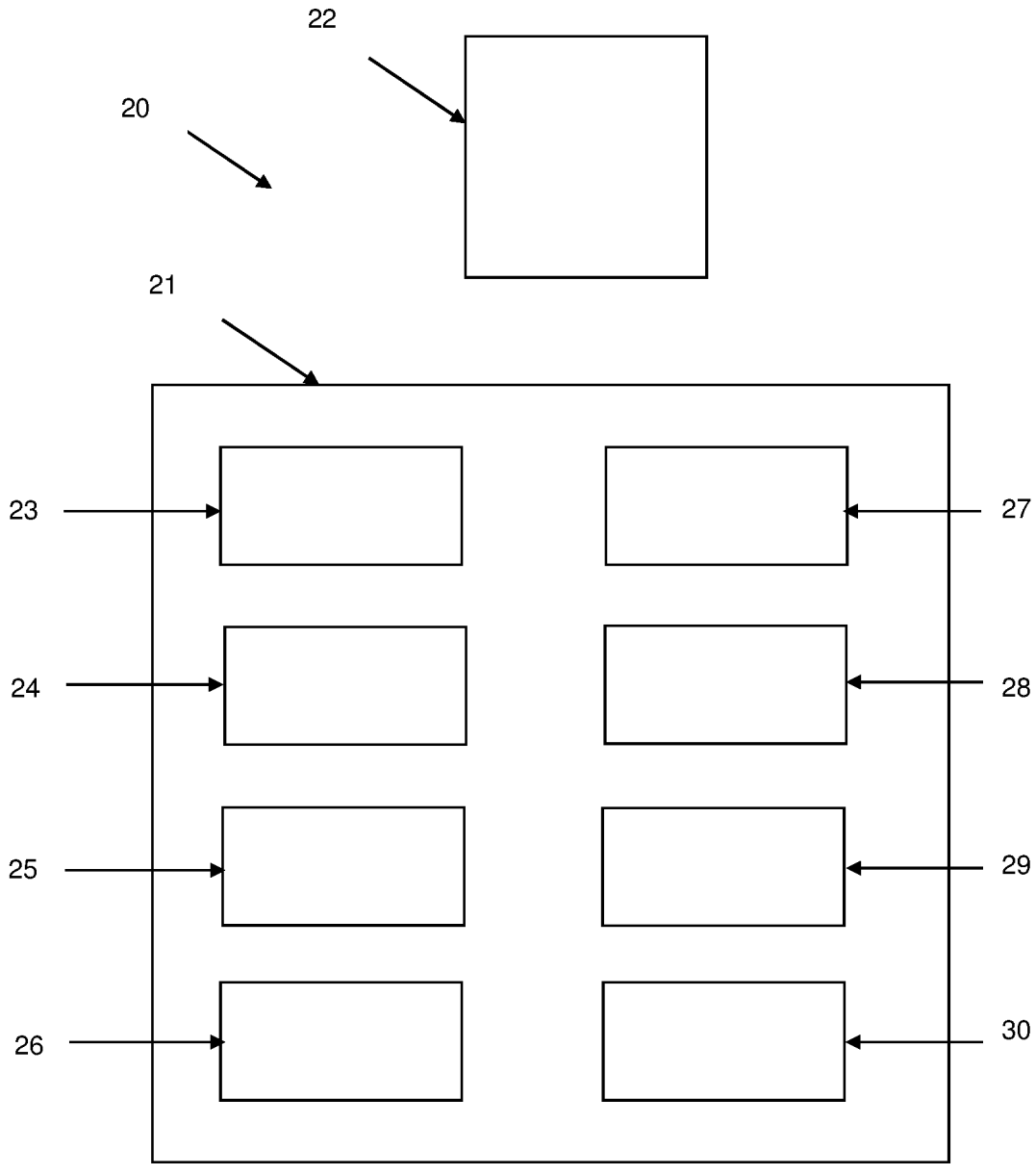
FIG. 3 illustrates a system for controlling a bias of an electro-optic modulator, wherein the electro-optic modulator comprises an input waveguide that is split into two paths, wherein the two paths are then recombined into an output waveguide, according to embodiments of the invention.

FIG. 3 illustrates a system for controlling a bias of an electro-optic modulator 20, wherein the electro-optic modulator comprises an input waveguide that is split into two paths, wherein the two paths are then recombined into an output waveguide, according to embodiments of the invention.

As shown in FIG. 3, the system 20 comprises a system for determining a required adaption of a bias of an electro-optic modulator 21 and a controlling device 22 that is configured to control the bias of the electro-optic modulator based on a required adaption of the bias of the electro-optic modulator determined by the system for determining a required adaption of a bias of an electro-optic modulator 21.

Therein, the controlling device can for example be realized by corresponding control units and/or code that is stored in a memory and executable by a processor.

Further, according to the embodiments of FIG. 3, the system for determining a required adaption of a bias of an electro-optic modulator 21 comprises a first recording device 23 that is configured to record a modulation voltage applied to the electro-optic modulator over a particular amount of time, a second recording device 24 that is configured to record a power at an output of the electro-optic modulator in response to the modulation voltage over the particular amount of time, a correlating device 25 that is configured to correlate the recorded modulation voltage and the recorded power, and a determining device 26 that is configured to determine a required adaption of the bias based on the correlation between the recorded modulation voltage and the recorded power.

The first recording device and the second recording device can respectively be realized by corresponding sensing means. Further, the correlating device and the determining device can for example respectively be realized by a code that is stored in a memory and executable by a processor.

As shown in FIG. 3, the system for determining a required adaption of a bias of an electro-optic modulator 21 further comprises a low-pass filter 27 that is configured to low-pass filter the modulation voltage applied to the electro-optic modulator, wherein the first recording device 23 is configured to record the filtered modulation voltage over the particular amount of time.

According to the embodiments of FIG. 3, the system for determining a required adaption of a bias of an electro-optic modulator 21 further comprises a re-order device 28 that is configured to re-order the recorded modulation voltage and the recorded power, wherein the determining device 26 is configured to determine the required adaption of the bias based on correlation of the correspondingly re-ordered value pairs.

Therein, the re-order device can for example be realized by code that is stored in a memory and executable by a processor.

Further, the shown system for determining a required adaption of a bias of an electro-optic modulator 21 also comprises a dividing device 29 that is configured to divide the modulation voltage applied to the electro-optic modulator into a plurality of ranges, wherein the plurality of ranges are respectively defined by their central value, and an averaging device 30 that is configured to, for each of the plurality of ranges, average the values of the output power recorded while the modulation voltage falls into the corresponding range to produce an averaged power value for the corresponding range, wherein the correlating device 25 is configured to, for each of the plurality of ranges, respectively correlate the corresponding central value and the averaged power value for the corresponding range.

Therein, also the dividing device and the averaging device can for example respectively be realized by code that is stored in a memory and executable by a processor.

Further, the shown system 20 can be configured to execute a method for controlling a bias of an electro-optic modulator as described above.

The invention claimed is:

1. A method for determining a required adaption of a bias of an electro-optic modulator, wherein the electro-optic modulator comprises an input waveguide that is split into two paths, wherein the two paths are then recombined into an output waveguide, and wherein the method comprises the steps of:

recording a modulation voltage applied to the electro-optic modulator over a particular amount of time;

recording a power at an output of the electro-optic modulator in response to the modulation voltage over the particular amount of time;

correlating the recorded modulation voltage and the recorded power; and determining the required adaption of the bias based on the correlation between the recorded modulation voltage and the recorded power, wherein the step of recording the modulation voltage includes gathering values of the modulation voltage over the particular amount of time;

the step of recording the output power includes gathering values of the output power over the particular amount of time; and the step of correlating the recorded modulation voltage and the recorded power includes determining a relation between the gathered values of the modulation voltage and the gathered values of the output power.

2. The method according to claim 1, wherein the method further comprises a step of low-pass filtering the modulation voltage applied to the electro-optic modulator, and wherein the step of recording the modulation voltage applied to the electro-optic modulator over a particular amount of time comprises recording the filtered modulation voltage over the particular amount of time.

3. The method according to claim 1, wherein the method further comprises a step of re-ordering the recorded modulation voltages and the recorded power, wherein the required adaption of the bias is determined based on correlation of correspondingly re-ordered value pairs.

4. The method according to claim 1, wherein the method further comprises dividing the modulation voltage applied to the electro-optic modulator into a plurality of ranges, wherein the plurality of ranges are respectively defined by their central value, and, for each of the plurality of ranges, averaging the values of the power at the output of the electro-optic modulator recorded while the modulation voltage falls into the corresponding range to produce an averaged power value for the corresponding range, and wherein the step of correlating the recorded modulation voltage and the recorded power comprises, for each of the plurality of ranges, respectively correlating the corresponding central value and the averaged power values for the corresponding range.

5. A method for controlling a bias of an electro-optic modulator, wherein the electro-optic modulator comprises an input waveguide that is split into two paths, wherein the two paths are then recombined into an output waveguide, and wherein the method comprises the steps of:

determining a required adaption of the bias of the electro-optic modulator by a method for determining a required adaption of a bias of an electro-optic modulator according to claim 1; and controlling the bias of the electro-optic modulator based on the determined required adaption of the bias.

6. A system for determining a required adaption of a bias of an electro-optic modulator, wherein the electro-optic modulator comprises an input waveguide that is split into two paths, wherein the two paths are then recombined into an output waveguide, and wherein the system comprises:

a first recording device that is configured to record a modulation voltage applied to the electro-optic modulator over a particular amount of time, wherein the recording of the modulation voltage includes gathering values of the modulation voltage over the particular amount of time;

a second recording device that is configured to record a power at an output of the electro-optic modulator in response to the modulation voltage over the particular amount of time, wherein the recording of the power at the output of the electro-optic modulator includes gathering values of the output power over the particular amount of time; and a correlating device that is configured to correlate the recorded modulation voltage and the recorded power, wherein the correlation of the recorded modulation voltage and the recorded power includes determining a relation between the gathered values of the modulation voltage and the gathered values of the output power; and a determining device that is configured to determine a required adaption of the bias based on the correlation between the recorded modulation voltage and the recorded power.

7. The system according to claim 6, wherein the system further comprises a low-pass filter that is configured to low-pass filter the modulation voltage applied to the electro-optic modulator, and wherein the first recording device is configured to record the filtered modulation voltage over the particular amount of time.

8. The system according to claim 6, wherein the system further comprises a re-order device that is configured to re-order the recorded modulation voltages and the recorded power, wherein the determining device is configured to determine the required adaption of the bias based on correlation of correspondingly re-ordered value pairs.

9. The system according to claim 6, wherein the system further comprises a dividing device that is configured to divide the modulation voltage applied to the electro-optic modulator into a plurality of ranges, wherein the plurality of ranges are respectively defined by their central value, and an averaging device (30) that is configured to, for each of the plurality of ranges, average the values of the power at the output of the electro-optic modulator recorded while the modulation falls into the corresponding range to produce an averaged power value for the corresponding range, and wherein the correlating device is configured, for each of the plurality of ranges, to respectively correlate the corresponding central value and the averaged power value of the corresponding range.

10. A system for controlling a bias of an electro-optic modulator, wherein the electro-optic modulator comprises an input waveguide that is split into two paths, wherein the two paths are then recombined into an output waveguide, wherein the system comprises a system for determining a required adaption of a bias of an electro-optic modulator according to claim 6 and a controlling device that is configured to control the bias of the electro-optic modulator based on a required adaption of the bias of the electro-optic modulator determined by the system for determining a required adaption of a bias of an electro-optic modulator.

* * * * *